United States Patent [19]

Sounik et al.

[11] Patent Number: 5,578,687
[45] Date of Patent: *Nov. 26, 1996

[54] PROCESS FOR PREPARING POLY(4-HYDROXYSTYRENE)

[75] Inventors: James R. Sounik; Keith M. Russ, both of Corpus Christi, Tex.

[73] Assignee: Hoechst Celanese Corporation, Somerville, N.J.

[*] Notice: The portion of the term of this patent subsequent to Sep. 26, 2015, has been disclaimed.

[21] Appl. No.: 542,584

[22] Filed: Oct. 13, 1995

[51] Int. Cl.⁶ ............................................. C08F 2/06
[52] U.S. Cl. .......................................................... 526/212
[58] Field of Search ............................................. 526/212

[56] References Cited

U.S. PATENT DOCUMENTS

| | | | |
|---|---|---|---|
| 3,213,069 | 10/1965 | Rausch | 526/234 |
| 3,857,816 | 12/1974 | Yamaguchi et al. | 526/89 |
| 4,085,169 | 4/1978 | Saito et al. | 526/212 |
| 5,087,772 | 2/1992 | Sheehan et al. | |
| 5,399,644 | 3/1995 | Wozny et al. | 526/234 |
| 5,453,483 | 9/1995 | Sounik et al. | |
| 5,463,141 | 10/1995 | Sounik et al. | |

FOREIGN PATENT DOCUMENTS

| | | | |
|---|---|---|---|
| 465367 | 5/1950 | Canada | 450/746.5 |
| 232282 | 1/1986 | Germany | 526/212 |
| 57-44609 | 3/1982 | Japan | 526/212 |
| 579379 | 8/1946 | United Kingdom | 526/234 |
| 608635 | 9/1948 | United Kingdom | 526/234 |

*Primary Examiner*—Joseph L. Schofer
*Assistant Examiner*—N. Sarofim
*Attorney, Agent, or Firm*—James J. Mullen; Donald R. Cassady

[57] ABSTRACT

A process for preparing a poly(hydroxystyrene) which comprises the steps of (a) heating a carbinol under decomposition conditions in the presence of a solvent for a sufficient period of time to form hydroxystyrene, said solvent having a boiling point in substantially the same range as said hydroxystyrene; and (b) polymerizing said hydroxystyrene under suitable polymerization conditions of pressure and temperature and for a sufficient period of time to form poly(hydroxystyrene).

23 Claims, No Drawings

PROCESS FOR PREPARING POLY(4-HYDROXYSTYRENE)

BACKGROUND OF THE INVENTION

1. Field of the Invention

The present invention relates to a process for the production of a poly(hydroxy)styrene) (PHS) such as poly(4-hydroxystyrene) directly from a carbinol such as 4-hydroxymethylcarbinol (HPMC).

2. Description of the Prior Art

In the past, one of the ways of preparing poly(4-hydroxystyrene) (PHS) was the use of 4-hydroxystyrene) (HSM) as the starting material; note European Patent Application No. 0-108-624. 4-Hydroxystyrene (HSM) is a well-known compound in the art.

The following prior art references are disclosed in accordance with the terms of 37 CFR 1.56, 1.97, and 1.93.

U.S. Pat. No. 5,087,772 (issued Feb. 11, 1992) discloses the preparation of HSM by reacting 4-acetoxystyrene (ASM) with a suitable alcohol in the presence of a catalytic amount of a suitable base.

European Patent Application No. 0-128-984 (publication no.), filed Aug. 30, 1983, discloses a process for the production of para-vinyl phenol (HSM) by dehydrogenation of para-ethyl phenol.

European Patent Application No. 0-108-624 (publication no.), filed Nov. 4, 1983, discloses a process for the production of p-vinyl phenol polymer (polyhydroxystyrene polymer-PHS) by polymerizing p-vinyl phenol (HSM) in the presence of water and iron.

U.S. Pat. No. 4,032,513 (issued Jun. 28, 1977) discloses a process of producing PHS by cationically polymerizing HSM in the presence of a nitrile, such as $CH_3CN$, using a cationic polymerization initiator in a homogeneous reaction system.

Other prior art references which relate to the present invention include U.S. Pat. Nos. 2,276,138; 3,547,858; 4,544,704; 4,678,843; 4,689,371; 4,822,862; 4,857,601; 4,868,256; 4,877,843; 4,898,916; 4,912,173; 4,962,147; 4,965,400; 4,880,487; 5,264,528; 5,342,727; and U.S. Pat. No. Re. 34,122.

All of the above-cited prior art and any other references mentioned herein are incorporated herein by reference in their entirety.

SUMMARY OF THE INVENTION

The present invention provides a process for preparing a poly(hydroxystyrene) which comprises the steps of (a) heating a carbinol under decomposition conditions in the presence of a solvent for a sufficient period of time to form hydroxystyrene, said solvent having a boiling point in substantially the same range as said hydroxystyrene, and (b) polymerizing said hydroxystyrene under suitable polymerization conditions of temperature and pressure and for a sufficient period of time to form poly(hydroxystyrene).

DETAILED DESCRIPTION OF THE INVENTION

It has unexpectedly been found that a poly(hydroxystyrene) (PHS) can be prepared by heating a carbinol, such as HPMC, with a select class of solvents, for a sufficient period of time under suitable decomposition conditions to form hydroxystyrene and then polymerizing said hydroxystyrene under suitable polymerization conditions to form said poly(hydroxystyrene). The unique feature of the present invention is the utilization of a solvent (a) which has a boiling point in substantially the same range as said hydroxystyrene, and (b) which is suitable for maintaining said solvent in the same vapor phase or in the same solution with said hydroxystyrene. Thus, the problems with the prior art usage of HSM are now overcome.

The present invention provides a novel process for preparing a poly(hydroxystyrene) via two steps, i.e. (a) heating a carbinol under decomposition conditions in the presence of a solvent for a sufficient period of time to form hydroxystyrene, said solvent having a boiling point in substantially the same range as said hydroxystyrene, and (b) polymerizing said hydroxystyrene under suitable polymerization conditions of pressure and temperature and for a sufficient period of time to form poly(hydroxystyrene).

In step (a), the carbinol used as the starting material has the general formula:

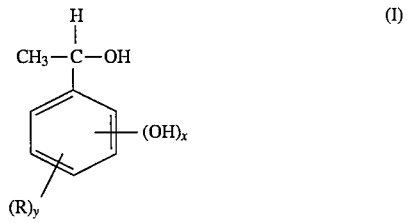

wherein R is selected from the group consisting of H, $C_{1-8}$, and halogen; x is an integer of 1–5; and y is an integer of 0–4, with the proviso that x+y is always equal to 5. $C_{1-8}$ includes, without limitation, methyl, ethyl, propyl, butyl, and the like. Halogen includes, without limitation, bromine, chlorine, fluorine, iodine, and the like. This carbinol can be prepared from the corresponding ketone.

In this first step (a), the decomposition/dehydration (used interchangeably herein) takes place at the melting point of the carbinol being used as the starting material. Generally, such temperatures are at least 100° C., preferably from about 125° C. to about 300° C. Any pressure (atmospheric, sub-atmospheric, and/or super atmospheric) can be used to facilitate this reaction. The time required for this step (a) will vary depending, inter alia, upon the starting carbinol used and the temperature. The decomposition of the carbinol unexpectedly results in the formation of a hydroxystyrene monomer such as HSM.

As previously pointed out, one of the critical features of the present invention is the use of a solvent which performs the functions and has the characteristics mentioned above. The solvents which can be used in this step (a) include (1) dipolar aprotic solvents, (2) halogenated hydrocarbons such as chloroform, trichloroethane, chlorobenzene, and the like, and (3) mixtures of (1) and (2). The dipolar aprotic solvents employed are solvents which have a high dielectric constant and a high dipole moment but no acid hydrogen atoms; for example, such solvents include dimethylsulfoxide (DMSO), acetonitrile, dimethylformamide (DMF), dimethylacetamide, hexamethylphosphoric acid triamide (HMPT), n-methyl pyrrolidone (NMP), and glycols such as triethylene glycol. Solvents such as ethanol, methanol, ethylene chloride, methylene chloride, or tetrahydrofuran (THF) may be used in combinations with the preceding solvents. The solvents are used in an amount of 1 to 200 mols, preferably 3 to 20 mols per mol of carbinol. It is to be understood that any solvent may be used under any temperature and reaction conditions so long as the solvent is also maintained in the same vapor phase or in the same solution with said hydroxystyrene.

In step (a), there may also be present in the reaction mixture a polymerization inhibitor in order to control and/or prevent the forming HSM (or related monomer) from immediately polymerizing to PHS (or related polymer). Such inhibitors include, without limitation, hydroquinone, t-butylhydroquinone, 2,5-di-t-butylhydroquinone, t-butylcatechol, p-methoxyphenol, m-methoxyphenol, and phenothiazine. Of course, any inhibitor can be used as long as the desired end result is achieved.

In step (b), the polymerization phase of the HSM monomer from (a) of the present invention thus is carried out at any reaction temperature whereby polymerization takes place such as at least −100° C., preferably between −100° C. and 300° C., and more preferably between 0° C. and 300° C. The reaction pressure may be subatmospheric, atmospheric, or superatmospheric.

The length of time which this polymerization step is conducted is not critical and the only requirement is that the polymerization be conducted for a period sufficient to form a poly(hydroxystyrene). Generally, this period is at least five minutes and may be as long as 25 hours.

In step (b), it is also desirable, but not critical, to employ a solvent to facilitate the reaction, i.e. a solvent which is suitable for polymerizing the hydroxystyrene at or under any polymerizable condition. Such solvent can be any of those mentioned above and can be the same or a different solvent as used in step (a), and one that is used in similar amounts as in step (a).

It is also within the scope of the present invention, in step (b), to employ polymerization initiator or accelerators (used interchangeably herein) in order to facilitate the reaction. Any substance may be used as the polymerization accelerator in the present invention if it accelerates or initiates polymerization of the HSM. For example, it is possible to use various polymerization accelerators described in Japanese Patent Publication (examined) Nos. 30123/82 and 47921/82 and Japanese Patent Publication (unexamined) Nos. 44607/82, 44608/82, and 44609/82, etc., all of which are incorporated herein by reference in their entirety.

Specific examples of the polymerization accelerators useful in the present invention include (1) cation initiators, e.g., (a) inorganic acids such as sulfuric acid, hydrochloric acid, nitric acid, or phosphoric acid, etc.; (b) metal halides such as aluminum chloride, tin tetrachloride, iron chloride, vanadium oxychloride, or boron trifluoride, etc.; (c) complexes such as ether complex of boron trifluoride or phenol complex of boron trifluoride, etc.; (d) aliphatic saturated monocarboxylic acids such as formic acid, acetic acid, chloroacetic acid, dichloroacetic acid, trichloroacetic acid, fluoroacetic acid, bromoacetic acid, idoacetic acid, trichloroacetic acid, oxymethoxyacetic acid, mercaptoacetic acid, cyanoacetic acid, propionic acid, 2-oxy-propionic acid, n-butyric acid, isobutyric acid, n-valeric acid, isovaleric acid, 4-keto-n-valeric acid, methylethylacetic acid, trimethylacetic acid, caproic acid, heptoic acid, caprylic acid, pelargonic acid, or capric acid, etc.; (e) aliphatic saturated polycarboxylic acids such as oxalic acid, malonic acid, succinic acid, glutaric acid, adipic acid, pimelic acid, tartaric acid, polyacrylic acid, or citric acid, etc.; (f) aliphatic unsaturated monocarboxylic acids such as acrylic acid, crotonic acid, or methacrylic acid, etc.; (g) aliphatic unsaturated polycarboxylic acids such as maleic acid or fumaric acid, etc.; (h) aromatic carboxylic acids such as benzoic acid, hydroxybenzoic acid, methoxybenzoic acid, chlorobenzoic acid, bromobenzoic acid, iodobenzoic acid, cinnamic acid, salicylic acid, toluic acid, phthalic acid, isophthalic acid, terephthalic acid, trimellitic acid, or pyromellitic acid, etc.; or (i) organic sulfonic acids such as methanesulfonic acid; ethane- sulfonic acid, benzenesulfonic acid or toluenesulfonic acid, etc.; and (2) radical initiators, e.g., azoisobutyronitrile, benzoyl peroxide, ammonium persulfate, t-butylperoxypivalate, and the like.

Phenol complex of boron trifluoride, sulfuric acid, hydrochloric acid, oxalic acid, phosphoric acid, chloroacetic acid, bromoacetic acid, benzenesulfonic acid, and toluenesulfonic acid are preferred polymerization accelerators.

The amount of these polymerization accelerators used varies according to the kind thereof, reacting conditions to be adopted and desired molecular weight of the polymer, etc. However, the amount is generally preferred to be in the range of 0.005 to 10% by weight based on the amount of the carbinol.

It is also within the scope of the present invention processes to use a catalyst in order to further facilitate the polymerization reaction. Such catalysts include, without limitation, acids and bases such as $H_2SO_4$, $H_3PO_4$, NaOH, etc. The amount of catalyst employed is any amount which will facilitate the reaction. Such amount will generally be from about 0.00001% by weight to about 2.0% by weight based on the total weight of carbinol employed.

It is also within the scope of the present invention to employ other monomers (as comonomers) to copolymerize with HSM and thus form a copolymer product. Consequently, one can use any monomer which will copolymerize with HSM to form a desired end copolymer. Suitable monomers include, without limitation, any vinyl substituted or unsubstituted monomer. Suitable comonomers include, without limitation, acrylic acid, methacrylic acid, methyl acrylate, butyl acrylate, t-butyl acrylate, cyclohexyl acrylate, methyl methacrylate, butyl methacrylate, t-butyl methacrylate, cyclohexyl methacrylate, styrene, 4-fluorostyrene, 4-chlorostyrene, 4-bromostyrene, 4-nitrostyrene, 4-methylstyrene, 4-acetoxystyrene, 4-t-butylcarbonylxystyrene, 4-methoxystyrene, and butadiene. The percent of each monomer used will depend on the desired end result.

After the polymerization of the hydroxystyrene (HSM) (with or without one or more comonomers), the end product (PHS) is recovered from the reaction product and the residual fraction containing any unreacted HSM can be recycled as the starting material for the next cycle. The end product (PHS) may be recovered from the reaction product by any method; for example, it can be separated from the fraction containing the unreacted HSM by precipitation and then filtration or any other suitable technique.

Use of suspension aids and/or emulsifier in the polymerization step is also within the scope of the invention.

The following specific examples are supplied for the purpose of better illustrating the invention. These examples are not intended, however, to limit or restrict the scope of the invention in any way and should not be construed as providing conditions, parameters, or values which must be utilized exclusively in order to practice the present invention.

CONTINUOUS FEED BATCH DEHYDRATION
OF 4-HYDROXYPHENYLMETHYLCARBINOL
(4-HPMC)

Example 1

A 500 mL three neck flask was fitted with a short path condenser with receiver and a vacuum outlet, an inlet attached to a peristaltic pump and reservoir, and a mechanical stirrer. To the flask was added triethylene glycol (TEG)(25.0 g) and KHSO$_4$ (0.8 g, 5.9 mmoles) and the flask was heated under vacuum (10 torr) until the TEG began distilling over (156° C.). Then a solution of 4-hydroxyphenyl methyl carbinol (4-HPMC) (38.3% in a 1:10 polyethylene glycol (200 average molecular weight) in TEG, phenothiazine inhibitor (0.02 g, 25 ppm based on 4-HPMC) was pumped into the flask at a rate of 120 g per hour. The pressure was maintained at 10 torr and the flask was maintained at 260° C. with an overhead temperature of 156° C. A total of 202.0 g of solution (77.4 g of HPMC, 0.56 moles) was introduced into the flask. A total of 129.7 g of a clear colorless liquid was recovered in the overhead receiver which contained 8.2% of 4-hydroxystyrene (10.6 g, 0.09 moles, 15.8% yield).

Example 2

The same procedure as in Example 1, except the flask was maintained at 280° C. and the overhead temperature was maintained at 158° C. A total of 200 g of solution (76.6 g of 4-HPMC, 0.56 moles) was introduced into the flask. A total of 204 g of a clear, colorless liquid was recovered in the overhead receiver which contained 26.8% of 4-hydroxystyrene (54.7 g, 0.46 moles, 82.1% yield).

Example 3

The same procedure as in Example 1, except the flask was maintained at 185° C. and the overhead temperature was maintained at 143° C. A total of 202 g of solution (77.4. g of 4-HPMC, 0.56 moles) was introduced into the flask. A total of 51.8 g of a clear colorless liquid was recovered in the overhead receiver which contained 49.7% of 4-hydroxystyrene (25.7 g, 0.22 moles, 38.3% yield).

Example 4

The same procedure as in Example 1, except the vacuum was maintained 10 torr, the overhead temperature was maintained at 164° C., and the amount of KHSO$_4$ was 1.6 g (11.8 mmoles). A total of 524 g of solution (200.7 g of 4-HPMC, 1.45 moles) was introduced into the flask. A total of 272 g of a clear, colorless liquid was recovered in the overhead receiver which contained 40.5% of 4-hydroxystyrene (110.2 g, 0.92 moles, 63.1% yield).

Example 5

The same procedure as in Example 1, except the vacuum was maintained 15 torr, the overhead temperature was maintained at 166° C., and the amount of KHSO$_4$ was 1.6 g (11.8 mmoles). A total of 736 g of solution (281.9 g of 4-HPMC, 2.04 moles) was introduced into the flask. A total of 446 g of a clear, colorless liquid was recovered in the overhead receiver which contained 30.8% of 4-hydroxystyrene (137.4 g, 1.14 moles, 56.0% yield).

Example 6

The same procedure as in Example 1, except the vacuum was maintained 15 torr, the overhead temperature was maintained at 168° C., and the amount of KHSO$_4$ was 1.6 g (11.8 mmoles). A total of 657 g of solution (251.6 g of 4-HPMC, 1.82 moles) was introduced into the flask. A total of 490.5 g of a clear, colorless liquid was recovered in the overhead receiver which contained 25.5% of 4-hydroxystyrene (125.1 g, 1.04 moles, 57.2% yield).

Example 7

The same procedure as in Example 1, except the vacuum was maintained 15 torr, the overhead temperature was maintained at 164° C. A total of 469 g of solution (281.9 g of 4-HPMC, 2.04 moles) was introduced into the flask. A total of 365 g of a clear, colorless liquid was recovered in the overhead receiver which contained 25.8% of 4-hydroxystyrene (94.2 g, 0.79 moles, 60.3% yield).

WIPED FILM DEHYDRATION OF 4-HYDROXYPHENYLMETHYLCARBINOL (4-HPMC)

Example 8

A Corning DSV2 vertical wiped film evaporator was fitted with a peristaltic pump and feed reservoir. The oil bath was set to 195° C., the vacuum was maintained at 10 torr, and then a mixture of 4-HPMC (738 g, 5.35 moles), triethyleneglycol (1101 g), polyethyleneglycol (73.8 g), phosphoric acid (6.1 g, 0.06 moles), and phenothiazine (0.018 g) was fed to the wiped film evaporator at a rate of 192 g per hour. The overhead temperature was maintained at 138°–142° C. A total of 804 g of a clear, colorless liquid was recovered in the overhead receiver which contained 17.3% of 4-hydroxystyrene (139.1 g, 1.16 moles, 21.7% yield).

Example 9

A Corning DSV2 vertical wiped film evaporator was fitted with a peristaltic pump and feed reservoir. The oil bath was set to 200° C., the vacuum was maintained at 10 torr, and then a mixture of 4-HPMC (164.3 g, 1.19 moles), triethyleneglycol (246.5 g), polyethyleneglycol (18.2 g), and phosphoric acid (0.71 g, 7.2 mmoles) was fed to the wiped film evaporator at a rate of 192 g per hour. The overhead temperature was maintained at 130°–133° C. A total of 234 g of a clear, colorless liquid was recovered in the overhead receiver which contained 14.4% of 4-hydroxystyrene (33.7 g, 0.28 moles, 23.6% yield).

Table 1 shows the analytical results of the product produced in Examples 1–9, and Table 2 gives the conversion, selectivity, and yield data.

TABLE 1

CONDITIONS AND ANALYTICAL RESULTS OF FEED BATCH AND WIPED FILM DEHYDRATION OF 4-HYDROXYPHENYL METHYL CARBINOL

| Example | Feed (g) | Overhead (g) | Catalyst (g) | mm Hg | % HPMC[1] | % ME[2] | % HSM[3] | % EP[4] | % 4-HAP[5] |
|---|---|---|---|---|---|---|---|---|---|
| 1 | 202 | 129.7 | 0.8 | 10 | — | 0.44 | 8.2 | 0.22 | 0.04 |
| 2 | 200 | 204 | 0.8 | 10 | 1.6 | 0.98 | 26.8 | 0.37 | — |

TABLE 1-continued

CONDITIONS AND ANALYTICAL RESULTS OF FEED BATCH AND
WIPED FILM DEHYDRATION OF 4-HYDROXYPHENYL
METHYL CARBINOL

| Example | Feed (g) | Overhead (g) | Catalyst (g) | mm Hg | % HPMC[1] | % ME[2] | % HSM[3] | % EP[4] | % 4-HAP[5] |
|---|---|---|---|---|---|---|---|---|---|
| 3 | 202 | 51.8 | 0.8 | 10 | 1.0 | 1.4 | 49.7 | 0.28 | 1.0 |
| 4 | 524 | 272 | 1.6 | 10 | — | — | 40.5 | — | — |
| 5 | 736 | 446 | 1.6 | 15 | 1.5 | 0.21 | 30.8 | 0.11 | — |
| 6 | 657 | 490.5 | 1.6 | 15 | 0.89 | 0.15 | 25.5 | 0.09 | — |
| 7 | 469 | 365 | 0.8 | 15 | 1.80 | 0.17 | 25.8 | 0.11 | 0.02 |
| 8[6] | 1913 | 804 | 6.1[7] | 10 | — | 4.7 | 17.3 | 0.34 | 0.04 |
| 9[6] | 429 | 234 | 0.71[7] | 10 | — | 9.6 | 14.4 | 1.10 | — |

[1]4-hydroxyphenylmethyl carbinol,
[2]1-(4-hydroxyphenyl)-1-methoxyethane,
[3]4-hydroxystyrene,
[4]4-ethylphenol,
[5]4-hydroxyacetophenone,
[6]wiped film results,
[7]phosphoric acid catalyst.

TABLE 2

RESULTS OF FEED BATCH DEHYDRATION AND
WIPED FILM DEHYDRATION
OF 4-HYDROXYPHENYL METHYLCARBINOL

| Example | Conversion | Selectivity | Yield |
|---|---|---|---|
| 1 | 100.0 | 15.8 | 15.8 |
| 2 | 95.7 | 85.7 | 82.1 |
| 3 | 99.3 | 38.5 | 38.3 |
| 4 | 100.0 | 63.1 | 63.1 |
| 5 | 97.6 | 57.4 | 56.0 |
| 6 | 98.3 | 58.2 | 57.2 |
| 7 | 96.3 | 62.6 | 60.3 |
| 8[1] | 100.0 | 21.7 | 21.7 |
| 9[1] | 100.0 | 23.5 | 23.5 |

[1]wiped film results using phosphoric acid catalyst

POLYMERIZATION OF 4-HYDROXYSTYRENE
IN TRIETHYLENEGLYCOL

Example 10

A three neck 100 mL round bottom flask was fitted with a nitrogen inlet and a condenser. To the flask was added a solution of 4-hydroxystyrene (17.3%, 8.65 g, 72.1 mmoles) in triethyleneglycol (50.0 g total weight) (the product of Example 8). The contents were purged thoroughly with nitrogen and then heated with an oil bath to 60° C. Then t-butylperoxypivalate (0.84 g, 3.62 mmoles) in mineral spirits was added. The flask was maintained at 60° C. for 16 hours. The flask was then cooled to room temperature and the solution was poured into water (200 mL). The precipitate was isolated by filtration and the solid was washed with water, vacuum dried (50° C., 60 torr), and weighed (6.08 g, 50.7 mmoles, 70.3%).

The poly(4-hydroxystyrene) obtained was soluble in polar organic solvents such as acetone, methanol, tetrahydrofuran, etc. The $\overline{M}_m$ was 15,119 and the $\overline{M}_m/\overline{M}_n$ was 3.45, respectively.

Example 11

A three neck 100 mL round bottom flask was fitted with a nitrogen inlet and a condenser. To the flask was added a solution of 4-hydroxystyrene (26.4%, 13.2 g, 0.11 moles) in triethyleneglycol (50.1 g total weight). The contents were purged thoroughly with nitrogen and then heated with an oil bath to 70° C. Then t-butylperoxypivalate (1.28 g, 5.51 mmoles) in mineral spirits was added. The flask was maintained at 70° C. for 19 hours. The flask was then cooled to room temperature and the solution was poured into water (400 mL). The precipitate was isolated by filtration and the solid was washed with water vacuum dried (50° C., 60 torr), and weighed (2.98 g, 0.023 moles, 22.6%).

The poly(4-hydroxystyrene) obtained was soluble in polar organic solvents such as acetone, methanol, tetrahydrofuran, etc. The $\overline{M}_m$ was 11,115 and the $\overline{M}_m/\overline{M}_n$ was 4.17, respectively.

Example 12

A three neck 100 mL round bottom flask was fitted with a nitrogen inlet and a condenser. To the flask was added a solution of 4-hydroxystyrene (49.7%, 12.96 g, 0.11 moles) in triethyleneglycol (26.08 g total weight) (the product of Example 3). The contents were purged thoroughly with nitrogen and then heated with an oil bath to 60° C. Then t-butylperoxypivalate (1.16 g, 5.00 mmoles) in mineral spirits was added. The flask was maintained at 60° C. for 18 hrs. The flask was then cooled to room temperature and the solution was poured into water (400 mL). The precipitate was isolated by filtration and the solid was washed with water, vacuum dried (50° C., 60 torr), and weighed (8.48 g, 0.07 moles, 64.2%).

The poly(4-hydroxystyrene) obtained was soluble in polar organic solvents such as acetone, methanol, tetrahydrofuran, etc. The $\overline{M}_m$ was 26,110 and the $\overline{M}_m/\overline{M}_n$ was 1.97, respectively.

Example 13

A three neck 100 mL round bottom flask was fitted with a nitrogen inlet and a condenser. To the flask was added a solution of 4-hydroxystyrene (26.4%, 13.23 g, 0.11 moles) in triethyleneglycol (50.0 g total weight). The contents were purged thoroughly with nitrogen and then heated with an oil bath to 70° C. Then azobisisobutyronitrile (AIBN) (0.93 g, 5.7 mmoles) was added. The flask was maintained at 70° C. for 16 hrs. The flask was then cooled to room temperature and the solution was poured into water (200 mL). The precipitate was isolated by filtration and the solid was washed with water, vacuum dried (50° C., 60 torr), and weighed (7.5 g, 62.5 moles, 56.7%).

The poly(4-hydroxystyrene) obtained was soluble in polar organic solvents such as acetone, methanol, tetrahydrofuran, etc. The $\overline{M}_m$ was 23,856 and the $\overline{M}_m/\overline{M}_n$ was 3.43, respectively. Table 3 gives the data obtained on the polymers obtained in this manner.

water, vacuum dried (50° C., 60 torr), and weighed (9.68 g, 0.081 moles, 70.2%).

The poly(4-hydroxystyrene)(t-butylacrylate) obtained was soluble in polar organic solvents such as acetone, methanol, tetrahydrofuran, etc. The $\overline{M}_n$ was 71,480 and the $\overline{M}/_n$ was 5.72 respectively.

Table 3 gives the data obtained on the polymers obtained in this manner.

TABLE 3

POLYMERIZATION AND COPOLYMERIZATION OF 4-HYDROXYSTYRENE IN TRIETHYLENEGLYCOL

| Ex. | M1 | M2 | Temp. °C. | Init. | % HSM | PHS $M_w$ | PHS PD[1] | UV[2] 248 nm |
|---|---|---|---|---|---|---|---|---|
| 10 | HSM[3] | — | 60 | t-BPP[4] | 17.3 | 15,119 | 1.76 | 327 |
| 11 | HSM | — | 70 | t-BPP | 26,4 | 11,115 | 4.17 | 355 |
| 12 | HSM | — | 60 | t-BPP | 49.7 | 26,210 | 1.97 | 571 |
| 13 | HSM | — | 70 | AIBN[5] | 26.4 | 23,856 | 3.43 | 212 |
| 14 | HSM | MMA[6] | 70 | AIBN | 26.4 | 34,500 | 6.0 | 127 |
| 15 | HSM | t-BA[7] | 70 | AIBN | 49.7 | 71,490 | 5.72 | 97 |

[1]polydispersity,
[2]molar extinction coefficient (L/m · cm),
[3]4-hydroxystyrene,
[4]t-butylperoxypivalate,
[5]azobisisobutyronitrile,
[6]methyl methacrylate,
[7]t-butylacrylate.

COPOLYMERIZATION OF 4-HYDROXYSTYRENE AND ACRYLATES IN TRIETHYLENEGLYCOL

Example 14

A three neck 100 mL round bottom flask was fitted with a nitrogen inlet and a condenser. To the flask was added a solution of 4-hydroxystyrene (32.8%, 13.37 g, 0.11 moles) in triethyleneglycol and methyl methacrylate (3.25 g, 0.03 moles). The contents were purged thoroughly with nitrogen and then heated with an oil bath to 70° C. Then azobisisobutyronitrile (AIBN) (1.0 g, 6.1 mmoles) was added. The flask was maintained at 70° C. for 16 hrs. The flask was then cooled to room temperature and the solution was poured into water (1000 mL). The precipitate was isolated by filtration and the solid was washed with water, vacuum dried (50° C., 60 torr), and weighed (9.6 g, 0.08 moles, 55.6%).

The poly(4-hydroxystyrene)(methyl methacrylate) obtained was soluble in polar organic solvents such as acetone, methanol, tetrahydrofuran, etc. The $\overline{M}_m$ was 34,500 and the $\overline{M}_m/\overline{M}_n$ was 6.0, respectively.

Example 15

A three neck 100 mL round bottom flask was fitted with a nitrogen inlet and a condenser. To the flask was added a solution of 4-hydroxystyrene (49.7%, 10.3 g, 0.086 moles) in triethyleneglycol (the product of example 3), t-butylacrylate (3.75 g, 0.029 moles), and triethyleneglycol (20.7 g). The contents were purged thoroughly with nitrogen and then heated with an oil bath to 70° C. Then azobisisobutyronitrile (AIBN) (0.95 g, 5.8 mmoles) was added. The flask was maintained at 70° C. for 16 hrs with four additions of AIBN (4×0.24 g, 1.5 mmoles) after each hour over the first four hours. The flask was then cooled to room temperature and the solution was poured into water (1000 mL). The precipitate was isolated by filtration and the solid was washed with Although the invention has been illustrated by the preceding examples, it is not to be construed as being limited thereby; but rather, the invention encompasses the generic area as hereinbefore disclosed. Various modifications and embodiments can be made without departing from the spirit and scope thereof.

What is claimed is:

1. A process for preparing a poly(hydroxystyrene) which comprises the steps of (a) heating a carbinol under decomposition conditions in the presence of a solvent selected from the group consisting of glycols, alcohols, and mixtures thereof for a sufficient period of time to form hydroxystyrene, said solvent having a boiling point in substantially the same range as said hydroxystyrene, and (b) polymerizing said hydroxystyrene under suitable polymerization conditions of pressure and temperature and for a sufficient period of time to form poly(hydroxystyrene), with the proviso that said solvent is also maintained in the same vapor phase or in the same solution with said hydroxystyrene.

2. The process as set forth in claim 1 wherein in step (b), the polymerization is also conducted in the presence of a solvent which has a normal boiling point in substantially the same range as said hydroxystyrene.

3. The process as set forth in claim 1 wherein the normal boiling point of said solvent is from about 250° C. to about 300° C.

4. The process as set forth in claim 1 wherein in step (b), the polymerization is also conducted in the presence of a solvent which is suitable for polymerizing said hydroxystyrene at any polymerizable condition.

5. The process as set forth in claim 4 wherein the polymerization takes place at a temperature of from about −100° C. to about 300° C.

6. The process as set forth in claim 1 wherein in step (b), the polymerization takes place in the presence of an initiator/accelerator.

7. The process as set forth in claim 1 wherein in step (b), the polymerization takes place in the presence of a catalyst.

8. The process as set forth in claim 1 wherein in step (b), the polymerization takes place in the presence of a suspension aid and/or emulsifier.

9. The process as set forth in claim 6 wherein the polymerization accelerator is selected from the group consisting of at least one cationic initiator selected from inorganic acids, metal halides, complexes of boron trifluoride, aliphatic saturated monocarboxylic acids, aliphatic saturated polycarboxylic acids, aliphatic unsaturated monocarboxylic acids, aliphatic unsaturated polycarboxylic acids, aromatic carboxylic acids, and organic sulfonic acids.

10. The process as set forth in claim 6 wherein the polymerization accelerator is selected from the group consisting of at least one radical initiator selected from azoisobutyronitrile, benzoyl peroxide, ammonium persulfate, and t-butylperoxypivalate and di-t-butylperoxide.

11. The process as set forth in claim 9 wherein the amount of the polymerization accelerator present is from about 0.005 to about 10% by weight based on the amount of carbinol.

12. The process as set forth in claim 1 wherein said carbinol has the formula:

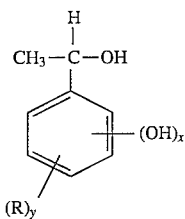

wherein R is selected from the group consisting of H, $C_{1-8}$, and halogen; x is an integer of 1–5; and y is an integer of 0–4, with the proviso that x+y is always equal to 5.

13. The process as set forth in claim 1 wherein in step (a), there is also present an inhibitor.

14. The process as set forth in claim 1 wherein said solvent has a normal boiling point range of from about 250° C. to about 300° C.

15. The process as set forth in claim 1 wherein said carbinol has the formula:

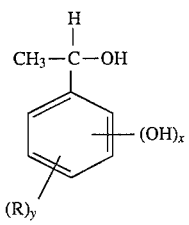

wherein R is selected from the group consisting of H, $C_{1-8}$, and halogen; x is an integer of 1–5; and y is an integer of 0–4, with the proviso that x+y is always equal to 5.

16. The process as set forth in claim 1 wherein there is also present an inhibitor.

17. The process as set forth in claim 16 wherein the inhibitor is selected from the group consisting of hydroquinone, t-butylhydroquinone, 2,5-di-t-butylhydroquinone, t-butylcatechol, p-methoxyphenol, m-methoxyphenol, and phenothiazine.

18. The process as set forth in claim 12 wherein said carbinol is prepared from a corresponding ketone.

19. The process as set forth in claim 1 wherein in step (b), there is also present a second monomer in order to produce a copolymer.

20. A process for the production of p-vinylphenol polymer which comprises decomposing 4-hydroxyphenylmethylcarbinol to a hydroxystyrene followed by polymerizing said hydroxystyrene, both in the presence of a solvent selected from the group consisting of glycols, alcohols, and mixtures thereof and which is characterized as being able to be maintained in the same vapor phase or in the same solution with said hydroxystyrene.

21. A process for preparing a poly(hydroxystyrene) which comprises the steps of (a) heating a carbinol under decomposition conditions in the presence of triethylene glycol for a sufficient period of time to form hydroxystyrene, and (b) polymerizing said hydroxystyrene under suitable polymerization conditions of pressure and temperature and for a sufficient period of time to form poly(hydroxystyrene).

22. A process for preparing hydroxystyrene which comprises the step of heating a carbinol under decomposition conditions in the presence of a solvent selected from the group consisting of glycols, alcohols, and mixtures thereof for a sufficient period of time to form said hydroxystyrene, said solvent having a normal boiling point in substantially the same range as said hydroxystyrene, and said solvent is also maintained in the same vapor phase or in the same solution with said hydroxystyrene.

23. A process for preparing hydroxystyrene which comprises the step of heating a carbinol under decomposition conditions in the presence of triethylene glycol for a sufficient period of time to form said hydroxystyrene.

* * * * *